DIRECT CURRENT REINSERTION CIRCUIT

Filed Dec. 15, 1949 2 SHEETS—SHEET 1

INVENTOR.
ROBERT C. MOORE
BY
Brown, Denk & Synnestvedt
AGENTS

INVENTOR.
ROBERT C. MOORE
BY
Brown, Denk & Lynnestvedt
AGENTS

Patented June 3, 1952

2,598,929

UNITED STATES PATENT OFFICE 2,598,929

DIRECT CURRENT REINSERTION CIRCUIT

Robert C. Moore, Erdenheim, Pa., assignor to Philco Corporation, Philadelphia, Pa., a corporation of Pennsylvania Application December 15, 1949, Serial No. 133,161

2 Claims. (Cl. 178—7.3)

The invention herein described and claimed relates to an improved D.-C. reinsertion circuit for television receivers.

In conventional television receivers, the slowly varying unidirectional component or so-called D.-C. component of the composite video signal is lost when the signal is passed through the A.-C. coupled stages of the video amplifier and, in the absence of a suitable signal-leveling circuit, the composite video signal would, over periods substantially in excess of a frame interval, tend to center about an axis with the areas of the waveform on each side of the said axis tending to be equal. In that case, neither the tips of the synchronizing pulses nor the blanking signals would be maintained along a fixed reference level, and both would vary continuously as a function of the average amplitude of the picture-signal component. This would, of course, be totally unsatisfactory, for the blanking signal would vary with picture-signal content, and the background illumination at the picture tube would vary as a function of the average amplitude of the picture-signal component. To avoid such a condition, means have been heretofore provided in television receivers for leveling the composite video signal either on the tips of the synchronizing pulses or on the blanking signals. Such signal-leveling means are ordinarily referred to as D.-C. reinsertion means.

The prior art D.-C. reinsertion circuits of which I have knowledge effect leveling by developing a D.-C. biasing voltage whose magnitude is a function of the maximum amplitude of the composite video signal. It will be seen, then, that if noise impulses be present whose amplitudes exceed that of the synchronizing pulses the proper functioning of such prior art leveling or D.-C. reinsertion circuits will be disturbed.

The present invention provides an improved D.-C. reinsertion circuit the operation of which is substantially undisturbed by the presence of recurrent noise impulses irrespective of whether or not the amplitudes of the noise impulses exceed that of the synchronizing pulses. The improvement effected is, however, dependent upon the time duration or duty cycle of the noise impulses.

The term duty cycle defines the relationship between the duration of the pulse (or total duration of a plurality of pulses) in a unit period of time and the length of the unit period of time. In the case of a television receiver, the unit period of time may be conveniently taken as the time interval between the leading edges of successive horizontal synchronizing pulses, which, in conventional television receivers, is 63.5 microseconds. If, for example, five noise impulses, each of one microsecond duration, occurred in the said 63.5 microseconds and if the time duration of a horizontal synchronizing pulse were five microseconds, as is conventional, then the duty cycle of the noise impulses would be equal to the duty cycle of the horizontal synchronizing pulses.

The circuit of the present invention operates in such manner that if the duty cycle of the recurrent noise impulses be small relative to the duty cycle of the horizontal synchronizing pulses, the circuit of the present invention will effectively ignore the noise, regardless of its amplitude. If, on the other hand, the duty cycle of the noise impulses is almost as large as, or larger than, that of the horizontal synchronizing pulses, the improvement effected by the present invention is somewhat reduced. It has been observed, however, that the duty cycle of electrical noise is frequently small relative to that of the horizontal synchronizing pulses, and the improvement contributed by the present invention will, therefore, be substantial and important.

An additional advantage of the improved circuit of the present invention is that the composite video signal may be effectively leveled on the blanking signal rather than on the tips of the synchronizing pulses. Thus, the average picture illumination is not disturbed when the video gain is adjusted.

The circuit of the present invention is so constructed and the parameters are so chosen that changes in the amplitude of the applied voltage in the region of and beyond the tips of the synchronizing pulses effect but negligible changes in the amount of charging current flowing into the capacitor of the leveling or D.-C. reinsertion circuit. As a consequence, noise impulses of small duty cycle whose amplitude may far exceed that of the synchronizing pulses are ineffective to charge the capacitor to a value appreciably greater than that developed by the blanking and synchronizing signals. The biasing voltage is, therefore, substantially unaffected by noise impulses of large amplitude but small duty cycle.

It is an object of this invention to provide, for a television receiver, a D.-C. reinsertion circuit which is substantially immune to impulse noise, including, particularly, small duty-cycle impulse noise whose amplitude far exceeds the maximum amplitude of the incoming video signal.

It is another object of this invention to provide, for a television receiver, an improved D.-C. reinsertion circuit capable of leveling the composite video signal on the blanking signal irrespective of the presence of strong impulse noise of small duty cycle.

These and other objects, features and advantages of the present invention will become clear from the following discussion taken together with the appended figures of drawing wherein.

Figure 1:
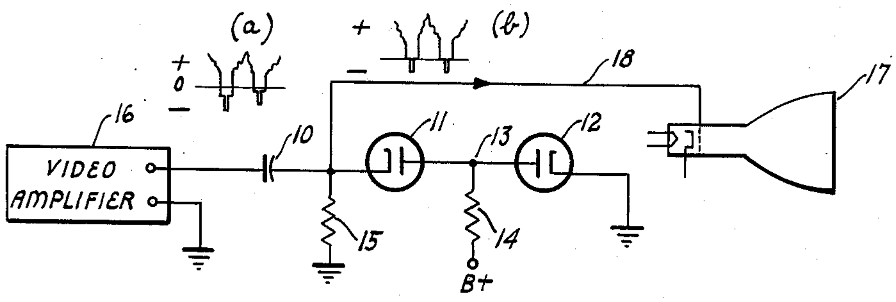
Figure 1 is a schematic representation of a portion of a television receiver embodying a D.-C. reinsertion circuit constructed in accordance with the teachings of the present invention.

Referring now to Figure 1, the improved D.-C. reinsertion circuit of the present invention is shown to comprise a capacitor 10, a first diode 11, a second diode 12, a resistor 14 and a resistor 15. The anodes of diodes 11 and 12 are connected together at junction 13, and the resistor 14 is connected between junction 13 and a source of positive D.-C. voltage, $B^+$. The cathode of the second diode 12 is connected to ground. The cathode of first diode 11 is connected to the right-hand plate of capacitor 10 and is connected to ground by way of resistor 15. Rectangle 16 represents a video amplifier the output of which is a composite video signal having the synchronizing pulses extending in the negative direction. In the absence of a leveling or D.-C. reinsertion circuit, the video signal, after passing through capacitor 10, would be centered about the zero A.-C. axis, as represented by waveform *a*. The action of the D.-C. reinsertion circuit of Figure 1 is such, however, that the video signal applied to the grid of cathode ray tube 17 is leveled on the blanking signal, as indicated by waveform *b*.

Figure 2:
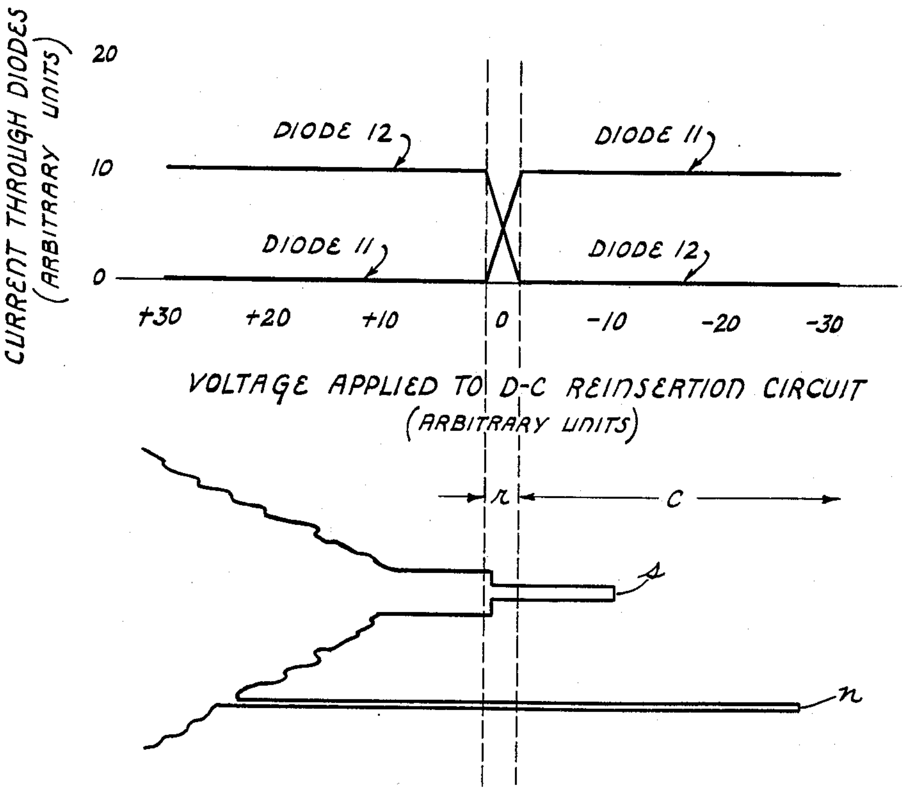
Figure 2 is a graphical representation which will be useful in explaining and understanding the operation of the circuit of Figure 1.

The operation of the circuit will now be described with the assistance of the graphical representations shown in Figure 2. A positive bias is quickly developed across resistor 15 which is effective to cut off diode 11 during substantially all of the picture-signal portion of the composite video signal. Diode 12, on the other hand, not being so biased, conducts strongly throughout the picture-signal portion by reason of the positive potential, B+, connected to its anode through resistor 14. In Figure 2, ten arbitrary units of current are shown as flowing through diode 12 during the picture-signal portion of the video signal, and zero current is shown as flowing through diode 11. However, when the blanking signal is applied across the terminals of the D.-C. reinsertion circuit, diode 11 starts to conduct and, thereafter, during the first portion of the leading edge of the synchronizing pulse, the current through diode 11 increases very rapidly. Simultaneously, for reasons to be described, the current through diode 12 decreases at a correspondingly rapid rate, and diode 12 quickly cuts off. When diode 12 cuts off, the current through diode 11 no longer increases at the rapid rate theretofore obtaining. On the contrary, the current through diode 11 thereafter remains substantially constant, as is clearly shown in Figure 2.

An explanation will now be given why, during that portion of the blanking interval which contains the leading edges of both the blanking and synchronizing pulses, the current through diode 11 increases rapidly to a maximum value while the current through diode 12 decreases rapidly to zero, the current through diode 11 thereafter remaining substantially constant. During the picture-signal portion of the video signal, when diode 11 is non-conductive, the current through diode 12 is, of course, determined by the resistance of resistor 14, the resistance of conducting diode 12, and the magnitude of the fixed voltage, $B^+$. The present invention contemplates that the resistance of resistor 14 will be so large relative to the resistance of conducting diode 12 that, in effect, resistor 14 alone determines the amount of current driven through diode 12 by the fixed voltage, $B^+$.

When the leading edge of the negative-going blanking signal is applied to the D.-C. reinsertion circuit, the potential of the cathode of diode 11 drops sharply, and diode 11 conducts. Thereupon, the potential of junction 13 and of the anode of diode 12 drops, and the current through diode 12 decreases. The current through resistor 14, however, remains substantially constant since its resistance is very high relative to that of the conducting diodes. In effect, then, the current which flows through diode 12 when diode 11 is non-conducting, is, when diode 11 conducts, rapidly diverted from diode 12 to diode 11, the current in resistor 14 remaining substantially constant.

After diode 12 cuts off, the degree to which the current through diode 11 increases with increase in negative voltage applied thereto is dependent upon the magnitude of resistor 14. Since, as indicated previously, the resistance value of element 14 is very large, the current through diode 11 will remain substantially constant with increase in applied negative voltage.

It will be seen, then, that if a noise pulse of short duration is present whose amplitude far exceeds that of the synchronizing pulse, the current which the noise pulse causes to flow through diode 11 will be substantially equal to that which is caused to flow by a synchronizing pulse. This may be clearly seen in Figure 2.

That the video signal may be leveled on the blanking signal (which is more desirable than leveling on the tips of the synchronizing pulses) will now be explained. In accordance with the present invention, after equilibrium has been established, the amount of charge added to capacitor 10 during the horizontal-synchronizing-pulse interval is constant, being independent of variations which may occur in the amplitude of the said synchronizing pulses. (The present invention contemplates that the synchronizing pulses will always extend beyond the region *r* of increasing current (Figure 2) and into region *c* of constant current.) The circuit parameters are so chosen that the amount by which capacitor 10 discharges during the non-conducting period of diode 11 will exceed by a predetermined small amount the amount of charge added to capacitor 10 by the horizontal synchronizing pulse. This can be readily done since the amount added by the said synchronizing pulse is fixed, as indicated above. In the absence of a leveling bias, the video signal shown graphically in Figure 2 would be centered about the zero A.-C. axis and, hence, would be located considerably to the right of the position shown in Figure 2.

It follows then, that, if after the leveling bias had been established, the charge added to capacitor 10 during the period that diode 11 conducts should be more than the amount discharged during its non-conducting period, the bias would increase and the video signal represented graphically in Figure 2 would move to the left. If that occurred, less of the blanking signal area would fall within the rising-current conducting region r and the charge added to capacitor 10 during the charging period would decrease. The resultant movement of the video signal to the right would be to the extent necessary to cause the charge to equal the discharge, thereby restoring the leveling bias to its desired established value. Thus, the video signal levels on the blanking signal.

The preferred embodiment of the present invention contemplates that the difference between the voltage at which diode 11 starts to conduct and that at which diode 12 cuts off will be substantially smaller than the difference between the blanking-signal voltage and that of the synchronizing signal. Thus, the tips of the synchronizing pulses will fall within the region c, wherein the current through diode 11 remains substantially constant with increase in applied negative-going voltage. Stated another way, the width of the region r is preferably substantially smaller than the height of the synchronizing pulse. This may be accomplished by keeping the impedance of diode 12 small relative to that of resistance 14.

It will be apparent from the foregoing that high-amplitude noise pulses of short duration, such as pulse n depicted in Figure 2, will have no appreciable effect upon the leveling bias since the total charge added to capacitor 10 as a result of such noise pulse is proportional to the duration of the pulse which, as above stated, is assumed to be short.

It will further be apparent that noise pulses whose occurrence coincides with the occurrence of synchronizing pulses will have no effect whatever on the leveling bias since they will cause no charging current to flow which would not be otherwise flowing and they will, therefore, cause no additional charging of capacitor 10.

Figure 3:
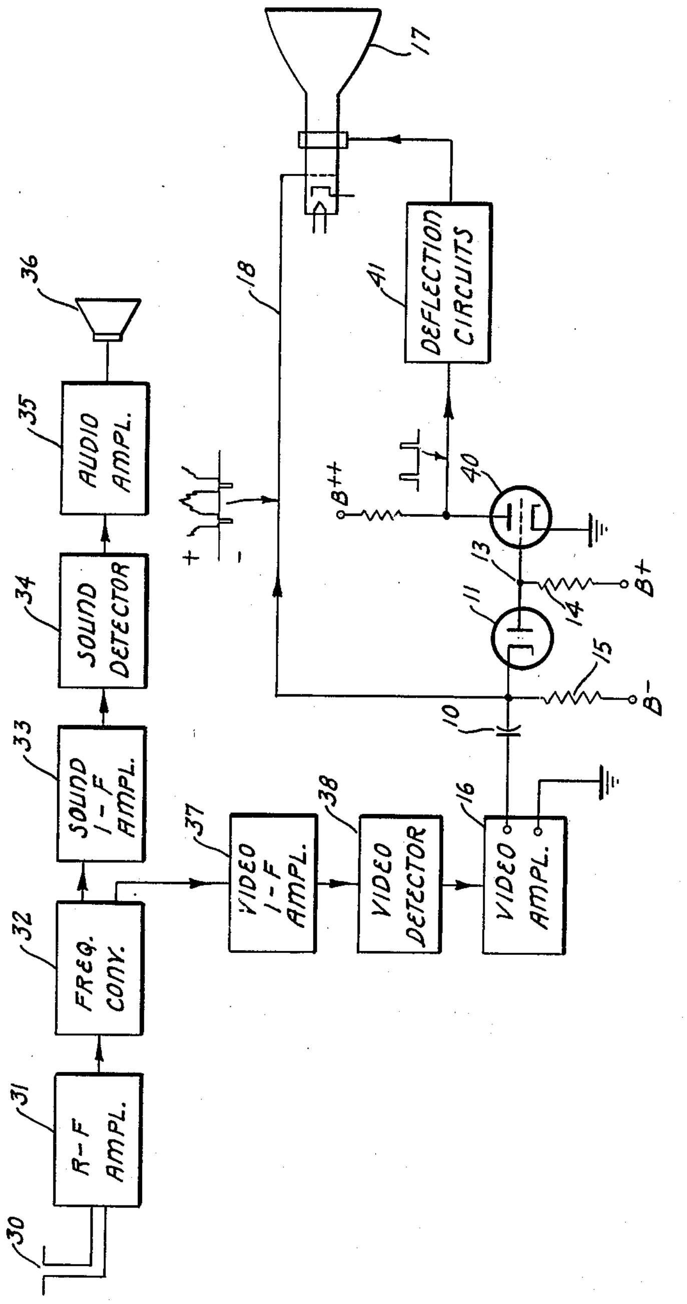
Figure 3 shows, partly diagrammatically, partly schematically, a television receiver employing a preferred embodiment of the improved D.-C. reinsertion circuit of the present invention.

Referring now to Figure 3, there is shown graphically a television receiver which includes a preferred embodiment of the present invention, the latter being shown schematically. The television receiver shown graphically includes, as is conventional, a dipole antenna 30, an R.-F. amplifier 31, a frequency converter 32, sound I.-F. amplifiers 33, a sound detector 34, audio amplifiers 35, a loudspeaker 36, video I.-F. amplifiers 37, a video detector 38, and video amplifiers 16.

The output of the last stage of video amplifier 16 is a video signal having its synchronizing pulses extending in the negative-going direction. This signal is applied to the combined D.-C. reinsertion and sync-separator circuit which embodies the present invention. The composite video signal, with the blanking signal leveled at a fixed D.-C. voltage as a result of the action of the D.-C. reinsertion circuit, is applied by way of lead 18 to the grid of the cathode ray tube 17. The synchronizing pulses, which appear picked off from the composite video signal in the output tube 40, are applied to the deflection circuits 41, and the sawtooth voltages developed therein are applied to the deflection coils or plates of the cathode ray tube 17 in known manner.

The action of the leveling portion of the combined D.-C. reinsertion and sync-separator circuit of Figure 3 is similar to that described above with respect to Figures 1 and 2. The structure of the leveling portion, except as noted hereinafter, is also similar to that of Figure 1 and like reference numerals are employed to identify like components. In the circuit of Figure 3, however, in lieu of employing a separate tube 12 as the second diode, the diode action of the grid and cathode electrodes of the triode 40 is utilized, the grid of the triode 40 functioning, of course, like an anode when grid current flows.

In Figure 3, the grid of triode 40 is connected to the anode of diode 11 at junction 13, and, as in Figure 1, junction 13 is connected, by way of a resistor 14, to a source of positive D.-C. voltage, $B^+$. Capacitor 10 and resistor 15 correspond to components bearing like reference numerals in Figure 1 but, in Figure 3, the resistor 15 is shown to be connected to a source of negative potential, $B^-$, rather than to ground as in Figure 1. The connection of resistor 15 to a source of negative voltage, $B^-$ is, however, not essential to the operation of the circuit of Figure 3. The purpose thereof is merely to control the absolute values of bias desired, the range of bias values being determined, of course, by the other circuit constants, including resistor 15 and capacitor 10.

The operation of the D.-C. reinsertion portion of the combined leveler and sync-separator circuit of Figure 3 is similar to that of Figure 1 and, to the extent that similarity exists, the explanation will not be repeated. During the picture-portion of the video signal, triode 40 conducts by reason of the positive bias on its grid. No A.-C. signal appears on the grid due to the fact that diode 11 is cut off. When the leading edge of the blanking signal is applied to the D.-C. reinsertion circuit, diode 11 conducts and thereafter the video signal appears on the grid of triode 40 until triode 40 cuts off. The plate voltage of the triode 40 is so chosen that the triode cuts off before the synchronizing signal on the grid has reached the most negative excursion.

The action of the sync-separator circuit is very stable for two reasons. One reason, of course, is that because of the action of my improved D.-C. reinsertion circuit, the level of the signal applied to the sync-separator is not disturbed by high-amplitude noise impulses of short duration. The other reason is that the applied signal is leveled on the blanking signal rather than on the tips of the synchronizing pulses. Variations in the amplitude of the synchronizing pulses will, therefore, have little or no effect upon the proper functioning of the sync-separator circuit.

It will be seen, then, that I have provided a leveling or D.-C. reinsertion circuit wherein the charge on a capacitor due to signal relative to the charge on this capacitor due to noise is proportional to the duty cycle of the signal compared to the duty cycle of the noise. The circuit is preferably arranged to operate on a signal duty cycle between the duty cycle of the synchronizing signal and that of the blanking signal. Since noise duty cycle is frequently small compared with that of the blanking-signal or synchronizing signal, the action of the leveling circuit in the presence of noise is substantially better than that of prior art leveling circuits.

Various embodiments, in adition to those illustrated and described in detail herein, may be constructed within the broad teaching disclosed herein.

Having described my invention, I claim:

1. In a television receiver having a source of composite video signal including a picture-signal component, a blanking-pulse component and a synchronizing-pulse component, the synchronizing-pulse component being superimposed upon the blanking-pulse component and constituting the signal of peak amplitude in a predetermined direction, the improvement which comprises the provision of leveling means for maintaining said blanking-pulse component at a substantially fixed reference level irrespective of variations in the amplitude of said synchronizing pulse or the presence of spurious pulses whose duty cycle is smaller, but whose amplitude is higher, than that of the synchronizing pulse, said leveling means comprising: a resistance capacitance (RC) network for developing a leveling bias; a charging circuit for said capacitance including a first unilateral conducting device so poled that its tendency to conduct increases when the video signal voltage applied to said (RC) network increases in said predetermined direction; charging-current control-means for limiting the amount of charging current to a substantially fixed predetermined amount, said control-means including a source of substantially fixed potential, a second unilateral conducting device, and a resistance connected between said source of fixed potential and said second device, the magnitude of said resistance being very high relative to that of either said first or second devices when conducting, said second device being so poled that it tends to conduct in response to said fixed potential applied thereto through said resistance but tends to stop conducting as the video signal voltage applied to said (RC) network increases in said predetermined direction, said source of fixed potential and said resistance being also included in said charging circuit, the circuit parameters of said leveling means being such that throughout a predetermined range of applied video voltages the charging current through said first device increases rapidly to said predetermined maximum value as the applied voltage increases in said predetermined direction, said predetermined range of voltages being small relative to the range of voltages whose limits comprise the blanking pulse and the synchronizing pulse, said charging current remaining substantially constant at said predetermined maximum value for applied voltages beyond said first-mentioned range in said predetermined direction.

2. In combination: a source of periodic pulses; and means for deriving a unidirectional bias potential from said pulses, said means comprising a source of constant potential, a first resistor connected in series with said source, a pair of parallel electrical paths shunting the series combination of said source and said first resistor, one of said paths including a first unidirectionally conductive element so poled with respect to said source of potential as to be normally conducting, the other of said paths including the series combination of a second unidirectionally conductive element and of a second resistor, the resistance of said first and second resistors being many times greater than the resistance of either of said unidirectionally conductive elements when conducting, said second unidirectionally conductive element being poled like said first element with respect to said source of potential but being normally non-conducting due to said second resistor, and means for applying said pulses to the junction of said second unidirectionally conductive element and of said second resistor with such polarity as to produce current flow through said second element, said last-named means including a capacitor connected intermediate said source of pulses and said junction, said unidirectional bias potential being developed at said junction.

ROBERT C. MOORE.

REFERENCES CITED

The following references are of record in the file of this patent:

UNITED STATES PATENTS

| Number | Name | Date |
|---|---|---|
| 2,214,847 | Wilson | Sept. 17, 1940 |
| 2,227,001 | Schlesinger | Dec. 31, 1940 |
| 2,227,026 | Schlesinger | Dec. 31, 1940 |
| 2,515,763 | Downie | July 18, 1950 |
| 2,520,012 | Montgomery | Aug. 22, 1950 |
| 2,525,103 | Sprecher | Oct. 10, 1950 |